Aug. 8, 1950 — A. H. THOMPSON — 2,518,399
LOCK WASHER
Filed June 17, 1946
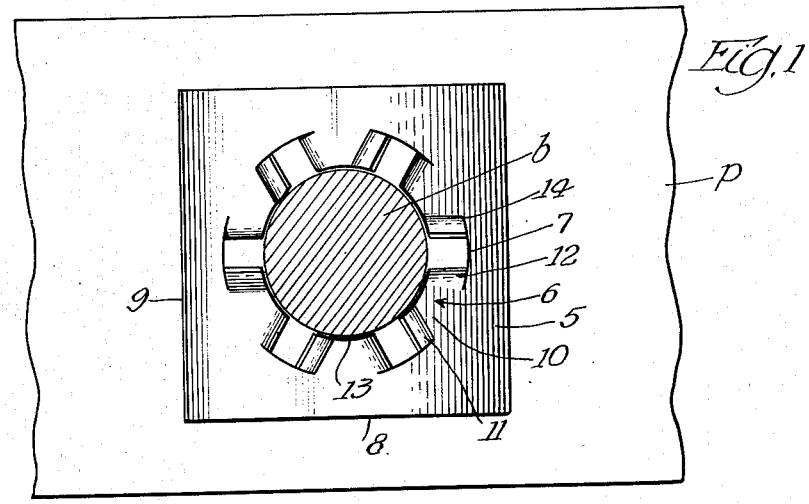
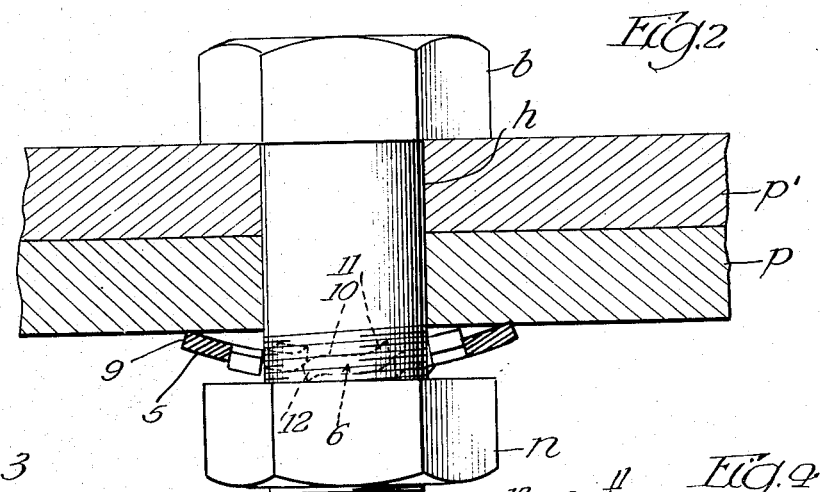
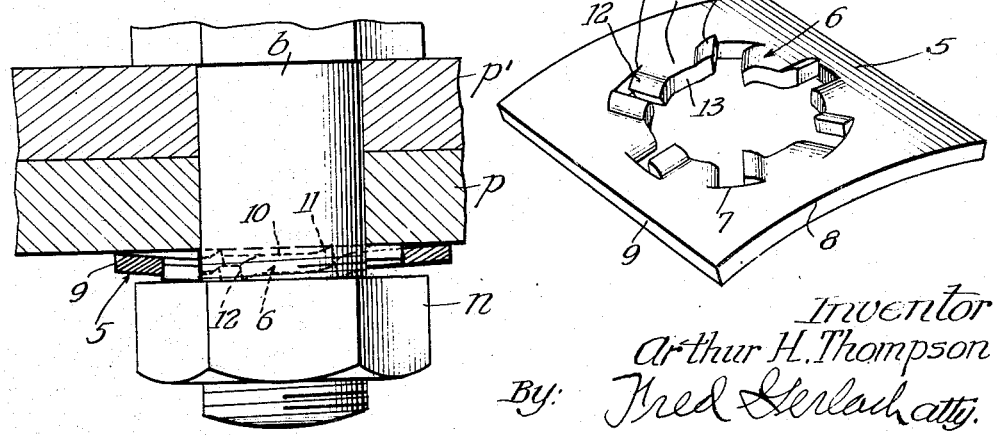
Inventor
Arthur H. Thompson
By: Fred Gerlach, atty.

Patented Aug. 8, 1950

2,518,399

UNITED STATES PATENT OFFICE 2,518,399

LOCK WASHER

Arthur H. Thompson, Chicago, Ill., assignor to Thompson-Bremer & Co., Chicago, Ill., a corporation of Illinois Application June 17, 1946, Serial No. 677,166

4 Claims. (Cl. 151—35)

The present invention relates to lock washers for use in connection with nut equipped bolts or tap bolts. More particularly the invention relates to that type of lock washer which is adapted, if used in connection with a nut equipped bolt, to be mounted on the shank of the bolt and interposed between the nut and the work, or if used in connection with a tap bolt, to be mounted on the bolt shank and to be interposed between the head of the bolt and the work, serves when in place to prevent loosening of the bolt with which it is used or associated, and consists of a square stamped metal body which has a central hole therein for receiving the shank of the bolt, embodies around the hole an annular series of equidistantly spaced, inwardly extending integral tongues with certain portions thereof bent obliquely to the body to form teeth for engaging the work and additional teeth for engaging the nut on the bolt or the head of the bolt depending upon whether the washer is used with a nut equipped bolt or a tap bolt, is bent so that it is uniformly arcuate in cross section between two opposed side edges thereof, is adapted to be applied against the work with the concave side thereof facing the work, and is further adapted when clamped against the work to be flattened to the end that the corners of the body dig into the work and grip the work with spring pressure.

The primary object of the invention is to provide a lock washer of this type which is an improvement upon, and has certain inherent advantages over, previously designed lock washers of the same general character and is characterized by the fact that two of the teeth equipped tongues are disposed diametrically opposite one another and are positioned directly opposite the central portions of the curved or arcuate side edges of the body in order that the body is reenforced at the points which are most likely to fracture when the washer is flattened as a result of being clamped against the work.

Another object of the invention is to provide a lock washer of the last mentioned character which is additionally characterized by the fact that there is an even number of teeth equipped tongues and the tongues are arranged or positioned so that the spaces between two pairs of diametrically opposite tongues are located directly opposite the central portions of the straight side edges of the body in order that the body is weakened at the points of maximum strength.

A further object of the invention is to provide a lock washer which is generally of new and improved construction, effectively and efficiently fulfills its intended purpose and is capable of being manufactured at a low cost.

Other objects of the invention and the various advantages and characteristics of the present lock washer will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like letters and numerals of reference denote corresponding parts throughout the several views:

Figure 1 is a bottom plan view showing a lock washer embodying the invention mounted on the shank of a nut equipped bolt and in contacting relation with the work, the shank of the bolt being shown in section for purposes of illustration;

Figure 2 is a side view of the nut equipped bolt, the washer being shown in section and before it is flattened as a result of tightening of the nut on the bolt;

Figure 3 is a side view of the bolt, the washer being shown in section and after the body thereof is flattened due to tightening of the nut on the bolt; and Figure 4 is a perspective view of the washer.

The lock washer which is shown in the drawing constitutes the preferred form or embodiment of the invention. It is illustrated in Figures 2 and 3 in connection with a pair of superposed work-pieces $p$ and $p'$, a bolt $b$ and a nut $n$. The two work-pieces are shown as being horizontally disposed and have formed therein a pair of equal sized, aligned holes $h$. The bolt $b$ is of conventional construction and is shown as having the shank thereof extending downwards through the hole $h$ and its head in abutment with the outer or upper face of the work-piece $p'$. The nut $n$ is mounted on the lower or screw threaded end of the shank of the bolt. The lock washer is shown in surrounding relation with the shank of the bolt and between the nut and the outer or lower face of the work-piece $p$. It is adapted when the nut $n$ is tightened to resist reverse rotation of the nut and thus hold the bolt in fixed relation with the work-pieces.

The subject lock washer is formed of any suitable highly resilient metal, such as steel. It is in the form of a one-piece stamping and consists of a body 5 and an annular series of equidistantly and laterally spaced tongues 6.

The body 5 is square and has a centrally disposed circular hole 7 for the shank of the bolt b. It is bent or stamped so that it is uniformly arcuate in cross section between two opposed side edges. Because of the manner in which the body 5 is bent the body embodies a pair of opposed curved side edges 8 and a pair of opposed straight side edges 9. It is contemplated that the washer when applied against the bottom face of the work-piece p will be applied with the concave side thereof facing the work-piece as best shown in Figure 2 of the drawing. It is further contemplated that when the nut n is tightened to its fullest extent the body of the washer, due to compression or clamping action, will be flattened against the outer or lower surface of the work-piece p to the end that the corners of the body will dig into said work-piece and grip it with such spring pressure as to hold the washer as a whole against rotation in either direction with respect to the shank of the bolt b. The body of the washer is of uniform thickness throughout and because it is square so far as its outer contour is concerned, its corners are pointed or right angled.

The tongues 6 are formed integrally with, and project inwards from, the hole defining portion of the body 5 and constitute the medium whereby reverse rotation of the nut n is resisted when the nut is in its operative or tightened position. They are six in number and consist of central parts 10 and teeth forming side parts 11 and 12. The thickness of the various parts of the tongues corresponds to the thickness of the washer body 5. The central parts 10 of the tongues are substantially flat and lie in the same plane as the body 5. They are inwardly tapered and have curved or arcuate inner end faces 13. The latter are adapted to engage the shank of the bolt b and serve to center the washer with respect to the bolt shank. The side parts 11 of the tongues 6 are substantially square in cross section and are disposed in a clockwise position with respect to the central parts 10. They are bent in the direction of the convex side of the washer body and so that they extend at approximately a 30° angle with respect to said side of the body. The outer side edges of the side parts 11 of the tongues are adapted to engage the adjacent end face of the nut n and, due to the inherent resiliency of the side parts 11, dig into said adjacent end face of the nut and thus resist reverse rotation of the nut with respect to the shank of the bolt. The other side parts of the tongues, i. e., the side parts 12, are the same in design and construction as the side parts 11 except that they are bent in the opposite direction. As shown in the drawing, the side parts 12 of the tongues are disposed at approximately a 30° angle with respect to the washer body 5 and extend in the direction of the concave side of the body. The outer side edges of the side parts 12 are adapted when the body of the washer is flattened in connection with tightening of the nut n, to dig into the outer or lower face of the work-piece p and, because of the inherent resiliency of the side parts 12, prevent the washer as a whole from turning or rotating in a counterclockwise direction with respect to the work-piece. The ends of the tongue side parts 11 and 12 that are adjacent the hole defining portion of the body are separated from such portion by way of slits 14 in order that bending of the side parts is uniform throughout their length.

As previously pointed out, the tongues 6 are six in number and are spaced equidistantly apart. The arrangement of the tongues is such that two diametrically opposite tongues are connected to the body 5 directly opposite the central portions of the curved or arcuate side edges 8. Because of this the body is reenforced at the points which are most likely to fracture when the washer body is flattened against the work-piece p in connection with tightening of the nut n. Due to the fact that the tongues are six in number and two diametrically opposite tongues are connected to the body directly opposite the central portions of the side edges 8 the spaces between the pairs of tongues that are between said two diametrically opposite tongues are located directly opposite the central portions of the straight side edges 9 of the washer body 5 and hence the body is weakened at the points or portions where it is of maximum strength. In other words, by having said diametrically opposite spaces located directly opposite the central portions of the straight side edges 9 the points of weakness of the washer body, i. e. the points wherein the body is of minimum radial width, are where the body is subjected to minimum distortion or stress when it is flattened in response to compression resulting from tightening of the nut.

When it is desired to use the washer the washer is applied to the threaded end of the shank of the bolt b so that the concave side thereof faces the outer or exposed face of the work-piece p. After so applying the washer the nut n is applied to said end of the bolt shank and is then tightened. It is contemplated that the nut will be tightened to its fullest extent. During tightening of the nut the side parts 11 of the tongues flex inwards and engage the adjacent end face of the nut with spring pressure and the side parts 12 of the tongues likewise flex inwards and engage with spring pressure the outer or exposed face of the work-piece p. As a result of flattening of the washer body the corners of the body dig into the work-piece p and, like the tongue side parts 12, engage it with spring pressure. When the nut is in its fully tightened position the side parts 12 of the tongues 6 and the corners of the body resist counterclockwise rotation of the body with respect to the work-piece p and the side parts 11 of the tongues resist counterclockwise rotation of the nut n with respect to the bolt b.

The herein described lock washer effectively and efficiently fulfills its intended purpose and, due to the arrangement of the tongues 6, is not likely to fracture when the body is flattened due to tightening of the nut.

In practice it has been found that the lock washer has special utility in connection with a bolt for a fishplate.

Whereas the washer has been described in connection with a nut equipped bolt it is to be understood that it can be used equally as well in connection with a tap bolt. When used with a tap bolt the washer is interposed between the head of the bolt and the adjacent face of the work and is positioned so that the concave side thereof faces the work. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. As a new article of manufacture, a one-piece stamped metal washer comprising a substantially square body having a central hole therein and bent so that it is uniformly arcuate in cross section between two opposed side edges thereof, and an annular series of equidistantly spaced tongues connected to, and extending inwardly from, the hole defining portion of the body, having the side parts thereof shaped to form teeth on, and outwards of, opposite sides of the body, and arranged so that two of the tongues are disposed diametrically opposite one another and are located directly opposite the central portions of the arcuate side edges of the body.

2. As a new article of manufacture, a one-piece stamped metal lock washer comprising a square body having a centrally disposed circular hole therein and bent so that it is uniformly arcuate in cross section between two opposed side edges thereof, and an annular series of equidistantly spaced tongues connected to, and extending inwards from, the hole defining portion of the body, having the side parts thereof that extend in a clockwise direction bent obliquely in one direction with respect to the body and their other side parts bent obliquely in the opposite direction with respect to said body, and arranged so that two of the tongues are disposed diametrically opposite one another and are located directly opposite the central portions of the arcuate side edges of the body.

3. As a new article of manufacture, a one-piece stamped metal lock washer comprising a substantially square body having a centrally disposed circular hole therein and bent so that it is uniformly arcuate in cross section between two opposed side edges thereof, and an annular series of equidistantly spaced tongues connected to, and extending inwards from, the hole defining portion of the body and having the side parts thereof shaped to form teeth on, and outwards of, opposite sides of the body, said tongues being of such number and so arranged that there are two diametrically opposite tongues located directly opposite the central portions of the arcuate side edges of the body and two diametrically opposite tongue defined spaces located directly opposite the central portions of the straight side edges of said body.

4. As a new article of manufacture, a one-piece stamped metal lock washer, comprising a square body having a centrally disposed circular hole therein and bent so that it is uniformly arcuate in cross section between two opposed side edges thereof, and an annular series of six equidistantly spaced tongues connected to, and extending inwards from, the hole defining portion of the body, having the side parts thereof shaped to form teeth on, and outwards of, opposite sides of the body, and arranged so that two of the tongues are disposed directly opposite the central portions of said two opposed side edges of the body.

ARTHUR H. THOMPSON.

REFERENCES CITED

The following references are of record in the file of this patent:

UNITED STATES PATENTS

| Number | Name | Date |
| --- | --- | --- |
| 1,373,061 | Ellmann et al. | Mar. 29, 1921 |
| 1,878,425 | Olson | Sept. 20, 1932 |